July 16, 1957 J. M. HILLEGAS 2,799,045
MULTIPLE TUBE EXTRUSION MACHINE FOR FORMING CORK RODS
Filed May 12, 1954 6 Sheets-Sheet 1

INVENTOR
Julian M. Hillegas
BY Mason, Porter, Diller & Stewart
ATTYS.

July 16, 1957 J. M. HILLEGAS 2,799,045
MULTIPLE TUBE EXTRUSION MACHINE FOR FORMING CORK RODS
Filed May 12, 1954 6 Sheets-Sheet 3

INVENTOR.
Julian M. Hillegas
BY
Mason, Porter, Diller & Stewart
ATTYS.

July 16, 1957   J. M. HILLEGAS   2,799,045
MULTIPLE TUBE EXTRUSION MACHINE FOR FORMING CORK RODS
Filed May 12, 1954   6 Sheets-Sheet 4
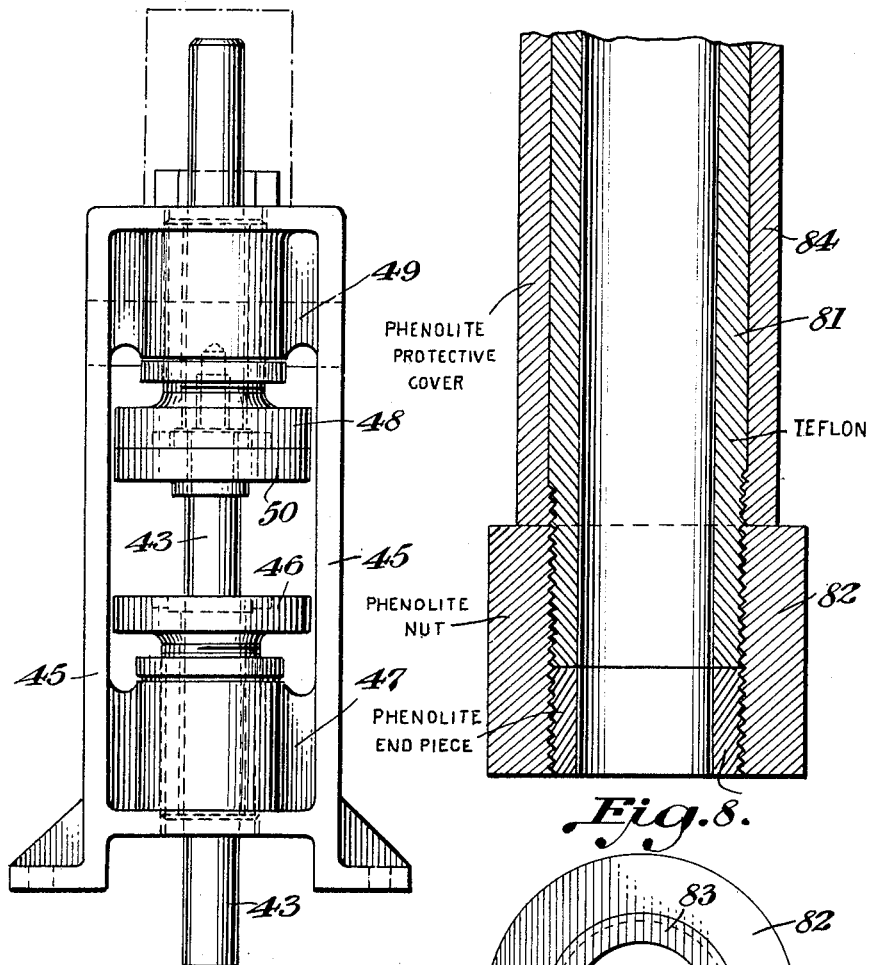
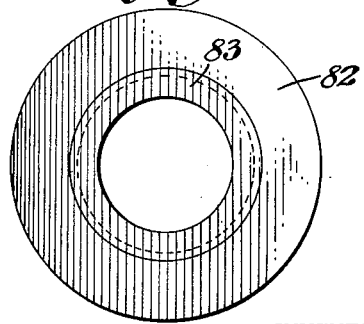
INVENTOR.
Julian M. Hillegas
BY
Mason, Porter, Diller & Stewart
ATTYS.

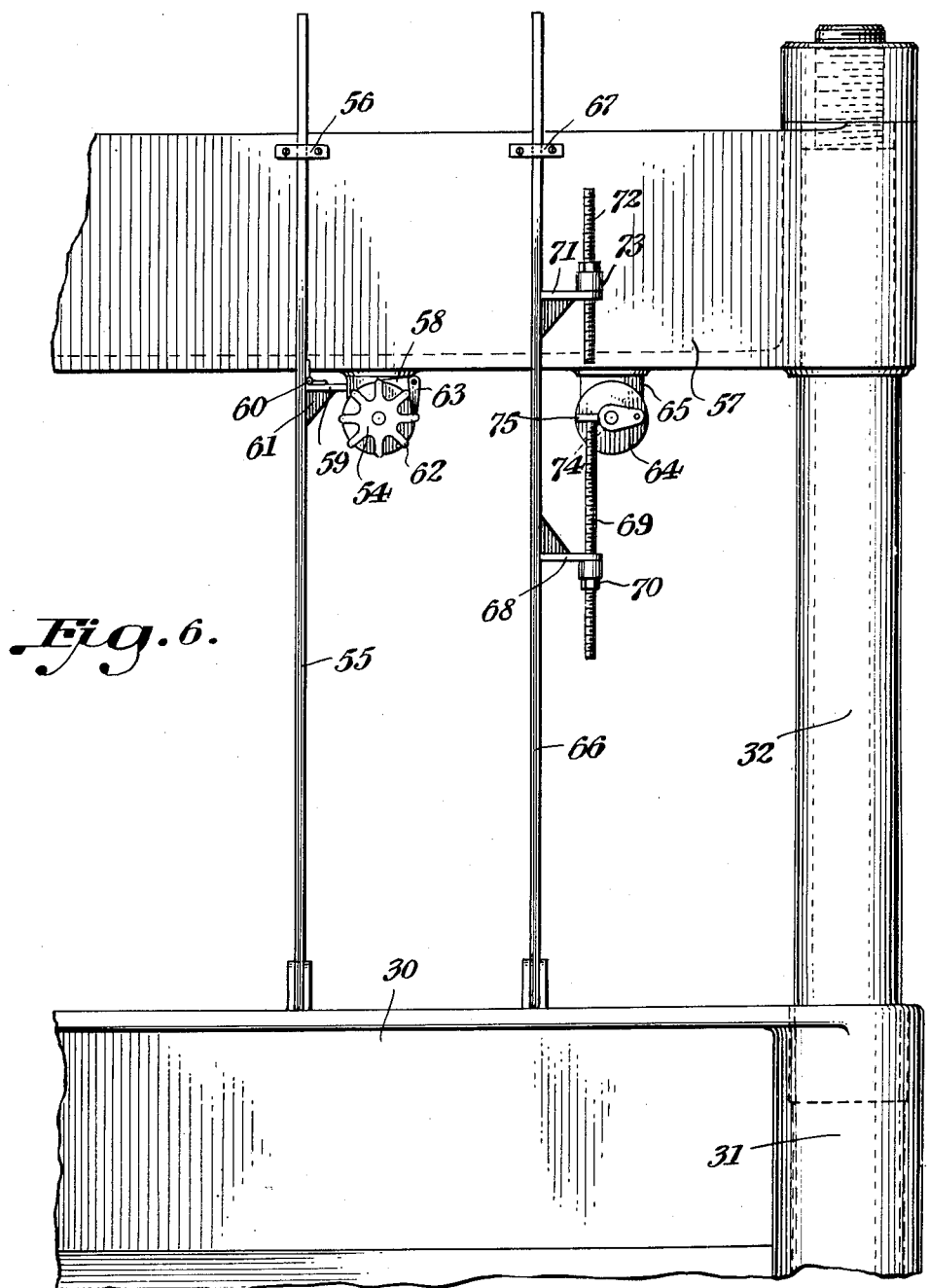

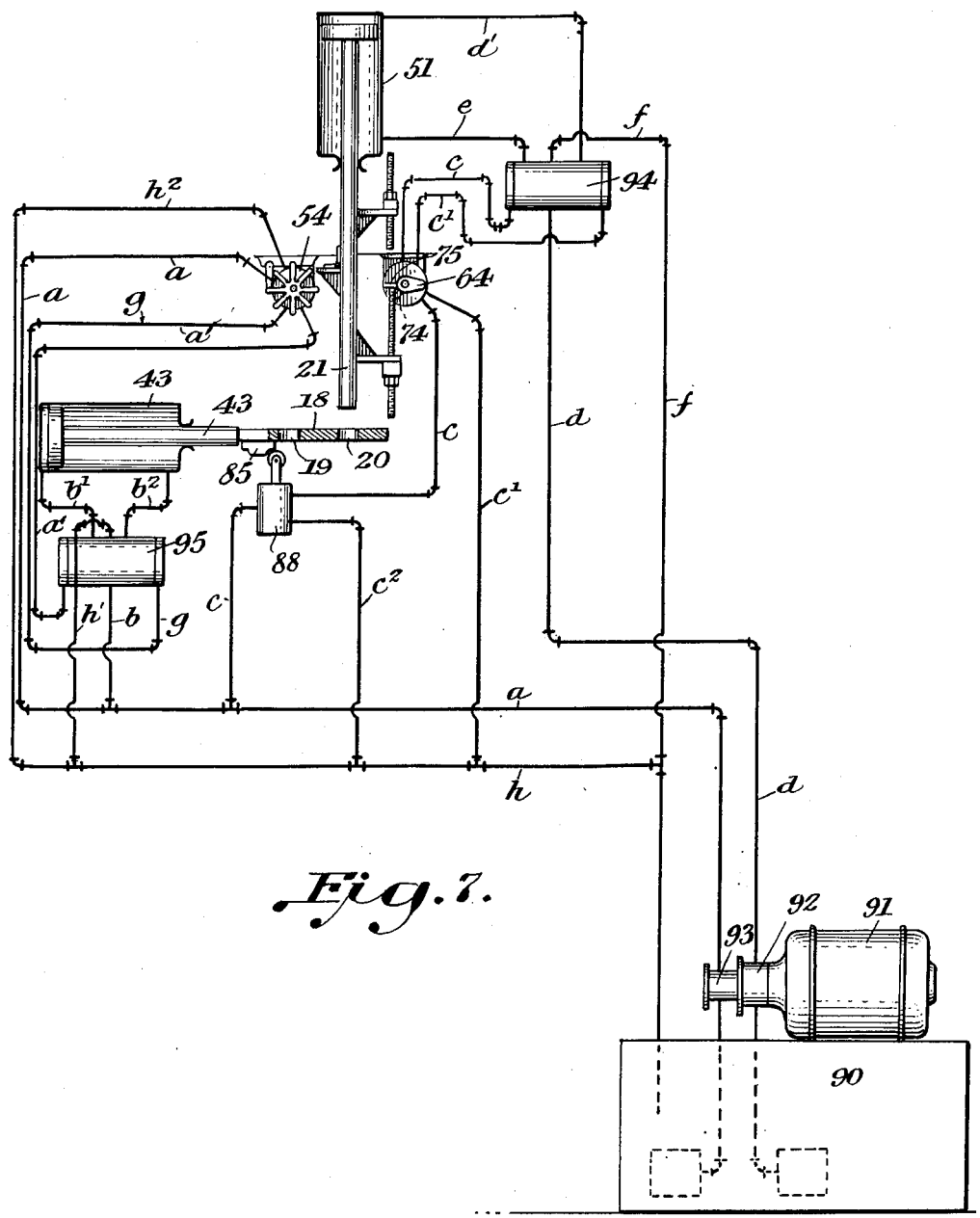

United States Patent Office 2,799,045
Patented July 16, 1957

2,799,045

MULTIPLE TUBE EXTRUSION MACHINE FOR FORMING CORK RODS

Julian M. Hillegas, Wilmington, Del., assignor to Continental Can Company, Inc., New York, N. Y., a corporation of New York Application May 12, 1954, Serial No. 429,224

2 Claims. (Cl. 18—5)

This invention relates to new and useful improvements in a multiple tube extrusion press for forming cork rods and the like.

An object of the invention is to provide a multiple extrusion press wherein the extrusion tubes, the measuring pocket therefor, and associated rams, are arranged in vertical alinement so as to uniformly distribute the cork granules and so as to produce a rod of uniform density.

A further object of the invention is to provide an extrusion press of the above type wherein the extrusion tubes include a rod forming section, a heating section for bonding the cork granules together, a setting up station having relatively low friction contact with the formed rod and a retarding section through which the rod is extruded for preventing undue expansion of the rod as it is released.

A still further object of the invention is to provide an extrusion press of the above type wherein the mechanisms for operating the feed slide and the rams are provided with an interlocking means which times the downward movement of the ram so as to insure alinement of the measuring pocket with the associated rams for the passing of the ram into and through a pocket.

These and other objects will in part be obvious and will in part be hereinafter more fully disclosed in the following description and accompanying drawings.

In the drawings which show by way of illustration one embodiment of the invention:

Figure 4 is an enlarged view of the alining devices for positioning the slide in alinement with the associated ram.

Figure 5 is an enlarged sectional view of the discharge end of the extrusion tube.

Figure 6 is an enlarged view showing the reciprocating crosshead carrying the rams, the pilot valve for controlling supply of fluid under pressure for operating the feed slide, the pilot valve for controlling the supply of fluid under pressure to the crosshead carrying the rams and the means carried by the crosshead for operating the pilot valves.

Figure 7 is a diagrammatic view showing the feed slide, the pilot controlled operating mechanism therefor, the ram and its pilot controlled operating mechanism and the interlocking means which times the operation of the ram so as to insure alinement of the measuring pocket with the ram for the passing of the ram into and through the measuring pocket.

Figure 8 is a bottom end view of the extrusion tube.

Figure 1:
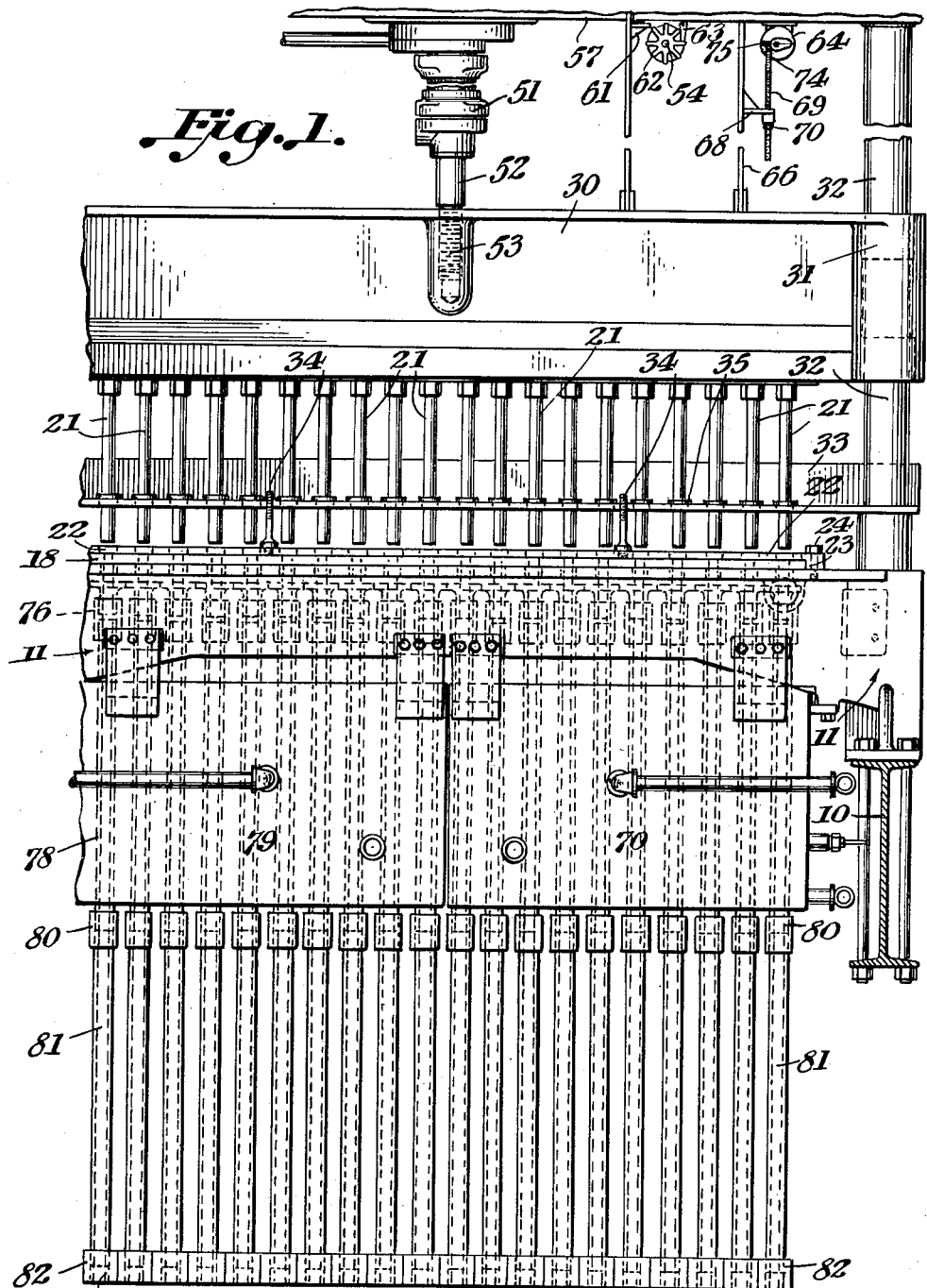
Figure 1 is a front view of a multiple tube extrusion press embodying the improvements, the feed hoppers and some of the frame structure being omitted for the sake of clearness.

In the drawings the frame structure for supporting the extrusion tubes and the operating mechanisms associated therewith is of the usual construction and only a portion thereof has been shown in the drawings.

Figure 1 of the drawings is a portion of a front view of the machine with the hoppers omitted for sake of clearness. The side frame structure of the machine includes webs 10 extending from front to rear of the machine. Mounted on this web is a cross beam 11. This cross beam is shown in section in Figure 2 and consists of a front web 12 and a rear web 13. The upper face 14 of the cross beam is flat and horizontal. Midway between the front and rear sides of the beam is a series of openings 15, one for each extrusion tube, the upper section 16 of an extrusion tube fits within said opening and is secured to the beam by suitable bolts 17, 17.

Figure 2:
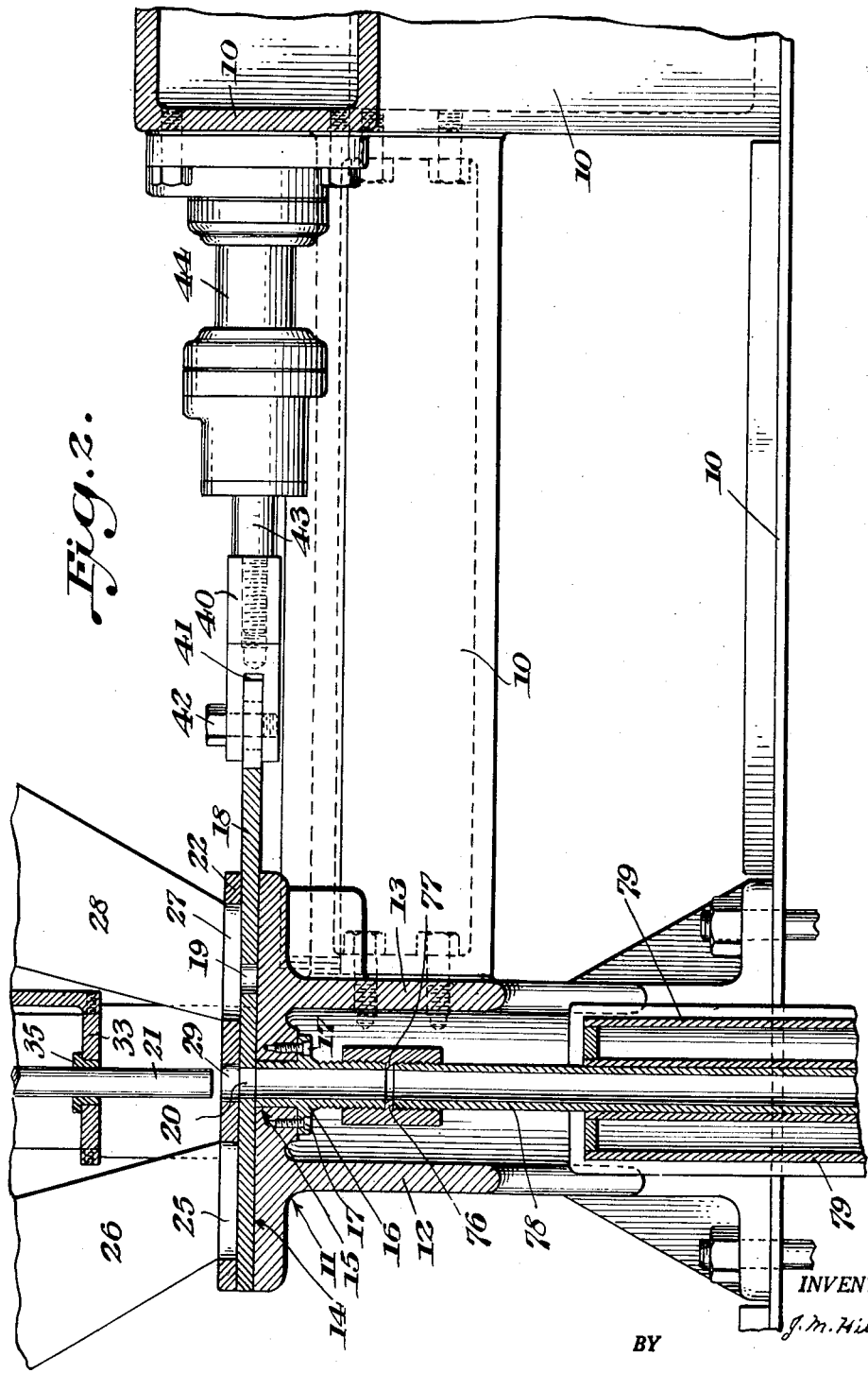
Figure 2 is a vertical sectional view from front to rear and showing a portion of one of the extrusion tubes and the manner of supporting the same, the feed slide with its measuring pockets, the hoppers for supplying the cork granules to the pockets and the means for reciprocating the feed slide.

Immediately above the beam and making sliding contact therewith is a feed slide 18. This feed slide is provided with rear measuring pockets 19 and front measuring pockets 20. As shown in Figure 2, the measuring pocket 20 is positioned in alinement with the extrusion tube and also with the associated ram 21.

Immediately above the slide is a plate 22 which extends from side to side of the machine and is supported by depending end portions 23 and securing bolts 24. The space between the plate 22 and the upper face 14 of the beam is uniform and dimensioned so as to provide a sliding fit for the feed slide 18. The slide 18 rests upon the upper surface 14 and is in close contact with the lower surface of the plate 22.

The plate 22 has an opening 25. Mounted in part on the plate 22 and in part on the frame structure is a hopper 26 in which a composition consisting of cork granules and a heat sensitive binder is stored and fed in measured quantities to the extrusion tubes.

There is a similar opening 27 at the rear of the plate and a similar hopper 28 also for mixed cork granules and binder. The hoppers extend across the front and the rear sides of the plate 22 and feed the mixed cork granules and binder to all of the measuring pockets. As shown in Figure 2 the measuring pockets 19 are being filled with the cork granules and binder mixture from the hopper 28. The pocket 20 is in alinement with the opening 29 and the ram 21 so that the ram may descend through the opening 29 and the pocket 20 into the forming section of the extrusion tube.

There is a crosshead 30 having at the ends thereof sleeves 31 mounted for reciprocation on rods 32. Only one end of the crosshead and the rod on which it reciprocates is shown in Figures 1 and 6. Mounted in this crosshead and depending therefrom is a series of rams 21. There is a ram associated with each extrusion tube and they are spaced on the crosshead so that the rams will cooperate with the feed pockets and associated extrusion tubes. There is a cross bar 33 extending across the machine and supported by connection to the side frames and also by standards 34, 34 mounted on the plate 22. This cross bar has openings through which the rams 21 pass and in each opening is a guiding sleeve 35 for the ram with which it is associated.

Figure 3:
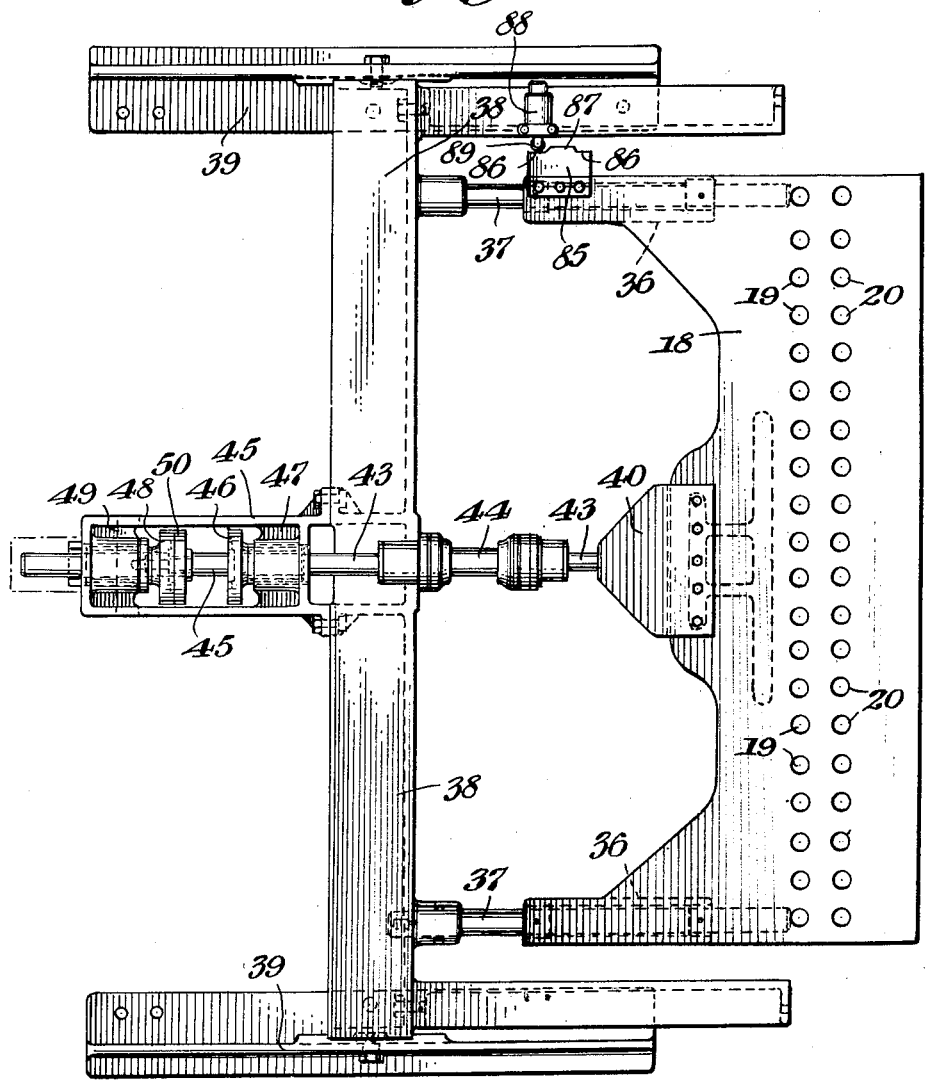
Figure 3 is a plan view of the feed slide, the frame structure for supporting the same and the means for operating the feed slide; also showing a mechanism for alining the pockets with the associated rams.

The feed slide 18 is shown in plan view in Figure 3. The pockets 20, 20 of the feed slide are arranged in a row and may be moved when the slide is retracted into alinement with the extrusion tubes. The pockets 19 are likewise arranged in a row and may be moved into alinement with the tubes when the slide is moved to forward position. The feed slide is supported by the cross beam 11. At each side of the feed slide 18 is a sleeve 36. These sleeves are indicated in dotted lines on Figure 3, The sleeves are mounted on guide rods 37, 37 respectively, which guide rods are supported by a cross beam 38 attached to side members 39, 39 of the framework. Attached to the middle of the feed slide 18 is a bracket 40. The bracket has a recess 41 which receives the feed slide and bolts 42 secure the bracket firmly to the feed slide. Threaded into the bracket is a piston rod 43 of a fluid operated motor 44. The piston rod extends through the motor and into a housing 45 carried by the cross bar 38. In this housing is positioned a stop disk 46 which is threaded into a section 47 of the housing. This stop disk may be shifted in an axial direction of the rod. There is another stop disk 48 which is threaded into the portion 49 of the housing. Mounted on the piston rod section extending into and through the housing is a disk 50. The rod 43 carries the disk 50 and the disks 46 and 48 limit the movement of the piston rod 43. When fluid is directed into the motor for shifting the feed slide, the feed slide is stopped in its movement, when positioning the pockets 19 beneath the rams by the disk 46, and when the feed slide is moved in the opposite direction to position the pockets 20 beneath the rams, the movement of the feed slide is stopped by the stop disk 48. Inasmuch as these disks can be adjusted the position of the feed slide can be very accurately adjusted in its positioning movement so that these pockets will be in proper alinement with the extrusion tubes and the rams associated therewith.

The crosshead 30 is moved up and down on the framework by means of a motor 51. The piston 52 of the motor is threaded into the crosshead as indicated at 53 in Figure 1. There is a pilot valve 54 which controls the flow of fluid to the motor operating the feed slide. There is a rod 55 connected to the crosshead 30 carrying the rams. This rod is guided by a bracket 56 attached to the top cross beam 57 of the framework. The rod will move up and down with the crosshead 30. The pilot valve is mounted in a bracket 58 mounted in turn on the underside of the cross beam 57. There is a pawl 59 hinged at 60 to the rod 55. This pawl normally rests on a bracket 61 which prevents the pawl from turning on its hinge when the rod is moving upwardly but when the rod is moving downwardly then the pawl will swing on its hinge. The pawl is so positioned as to contact the radial fingers 62 of the pilot valve and will give a movement to the pilot valve in a clockwise direction when the rod moves upward but when the rod moves downward the pilot valve will not be turned. There is a ratchet pawl 63 which prevents the pilot valve from turning in a counter-clockwise direction. The control of the fluid supplied to the motor operating the feed slide will be described more in detail later.

The pilot valve 64 is mounted on a bracket 65 in turn mounted on the underside of the cross beam 57. This pilot valve reverses the flow of fluid to the motor for moving the rams up and down. A rod 66 is mounted on the crosshead 30 and moves up and down therewith. The rod is guided by a bracket 67 attached to the cross beam 57. The rod carries a bracket 68 in which is mounted a threaded rod 69. This rod may be shifted to different positions on the bracket and is secured in a set position by a clamping nut 70. There is a second bracket 71 carried by the rod 66. Mounted in this bracket 71 is a threaded rod 72 which may be shifted to different positions and locked in a set position by a nut 73. When the rod 66 moves upward with the rams, the rod 69 carried by the brackets 60 is so set that it will engage the arm 74 of the pilot valve and raise it to a horizontal position. This will turn the valve so that fluid will be directed to the motor for moving the rams in a downward direction. On the other hand when the crosshead descends the rod 72 will engage the arm 75 and this will shift the pilot valve so as to direct fluid to the motor for the raising of the same.

The extrusion tubes are all alike in construction and the description of one will answer for the others. The extrusion tube includes an upper section 16 which is attached to the cross beam of the machine. Threaded onto the lower end of this section 16 is a coupling sleeve 76 having an abutment shoulder 77 midway between its ends and the upper section is threaded into the coupling until its end contacts its shoulder. Threaded into the lower end of the coupling is a tube 78, the end of which engages the abutment shoulder. This forms a passage of uniform diameter.

The section 16 and the tube 78 are preferably formed of brass and plated with chromium. The first five or six inches of the brass tube are generally referred to as the cold area where the first formation of the cork granules into the bar takes place. Surrounding the chrome plated brass tube is a heating jacket 79. This heating jacket is shown in two sections and is supplied with the steam connections in the usual manner. It is in this section of the tube passing through the heating jacket that the binder for the cork granules is heated and so distributed among the cork granules as to bond them together. The brass tube 78 extends all the way through the heating jacket and there is secured to the lower end of the brass tube a coupling 80 similar to the coupling 76. Threaded into this coupling 80 is an extension tube 81 which is preferably made from a polytetrafluoroethylene resin, commonly known by the trade name Teflon. This material is found to possess the desired qualities of rigidity and has a low coefficient of friction. It is while the bonded cork rod is passing through this Teflon tube that the setting up of the rod particles is accomplished. The bonding of the cork granules together is set and there is little or no lateral expansion of the cord rod when it passes through this extrusion tube section 81. The lower end of the Teflon tube 81 is threaded to receive a nut 82 made of a phenolformaldehyde resin such as that known under the tradename "phenolite." An end-piece 83 is secured to the end of the Teflon tube 81 by this nut 82. This end-piece is likewise of phenolite and may be of the same diameter as the Teflon tube and still retard the movement of the formed rod as it is extruded from the Teflon tube. This is due to the fact that the coefficient of friction of the phenolite is higher than the coefficient of friction of the Teflon. The diameter of this end-piece may be slightly smaller than the diameter of the Teflon tube. Without this end-piece the rod is likely to expand lengthwise as it leaves the Teflon tube but when the extruding of the rod is retarded by this phenolite end-piece there will be no endwise or lateral expansion of the rod.

In Figure 5 the Teflon tube 81 is shown as surrounded by a protective cover 84 which is preferably made of phenolite. This protective cover may be omitted but when used it extends the whole length of the Teflon section of the extrusion tube.

The feed slide 18 is preferably made of aluminum. This makes it very light and permits of its being rapidly shifted to bring either pocket 19 or 20 from its respective hopper to a position directly over the extrusion tube. The pocket is accurately dimensioned both as to dimension and height and will feed the same amount of cork to the extrusion tubes at every stroke of the ram associated therewith. The feed slide may be made thicker or thinner to change the amount of cork fed to the tubes. This feeding device also spreads the cork evenly in the extrusion tube which makes a good pattern of cork particles in the rod and a rod of uniform density. The ram not only moves a sufficient distance into the extrusion tube as to form a rod portion, but the rod portion thus formed forces the already formed part of the rod forward. Thus the formed rod is moved step by step through the heating section of the extrusion tube and then through the Teflon tube. The rod moves very easily in the Teflon tube owing to the low coefficient of friction of the Teflon. This tube is relatively long and, therefore, the rod may move more rapidly and at the same time the rod will be properly set so as to hold its form after it leaves the extrusion tube. Otherwise the rod would expand and the surface would crack and make the rod unacceptable. The short plastic endpiece is used to provide a braking action to the rod. Otherwise, the rod might expand lengthwise.

Mounted on the feed slide 18 is a cam 85 having at its opposite ends low sections 86, 86, and a high section 87 intermediate the low sections. Mounted on the frame is a valve 88. A roller 89 on the stem of the valve is in the path of the cam 85. When this roller is on the low end sections 86 the valve is open but when on the high intermediate section 87 this valve is closed. The valve 88 is in line with pilot valve 64 which operates four-way valve 94. Inasmuch as fluid can only pass through the valve 88 when the feed slide has either the pockets 19 or 20 in actual alinement with the rams, the rams cannot be operated to move into and through the pockets unless these pockets are centered beneath the rams.

In Figure 7 of the drawing there is illustrated diagrammatically the fluid connections for operating the motor which raises and lowers the rams and also the motor for moving the feed slide. As illustrated in this diagrammatic view fluid is drawn from a tank 90. A motor 91 operates a pump 92 for furnishing fluid for operating the motor 51 associated with the rams. A smaller fluid pump 93 furnishes fluid to the motor 43 for moving the feed slide back and forth. Associated with the motor 51 is a four-way valve 94. This valve is of the usual construction and has not been shown in detail.

Fluid is furnished from the pump 92 to the four-way valve 94 through the line $d$ and from the four-way valve 94 through either the line $d'$ or $e$ to one end or the other of the motor. When fluid is furnished through line $d'$ to the upper end of the motor the lower end of the motor exhausts through the line $e$ and the four-way valve 94 to the return line $f$ which leads to the tank. The position of the four-way valve is determined in part by the pilot valve 64 and in part by the valve 88. The pump 93 furnishes fluid through line $a$ thence to line $c$, the valve 88, when open, and the pilot valve 64 to the four-way valve 95 for shifting the same. The exhaust from the four-way valve is returned through the line $c'$, the pilot valve, and the line $c'$ to the return line $h$. When the ram moves upward it will shift the pilot valve 64 so as to permit the fluid to shift the four-way valve so as to direct operating fluid through the line $d'$ to the upper end of the motor cylinder 51. If the valve 88 is closed then there will be no passing of the operating fluid to the motor 51. When the feed slide has moved so that one of the pockets is beneath the ram so that the ram may pass through the pocket and into the extrusion tube, then the roller will pass onto the low roller portion at one end of the cam 85 and the valve 88 will be opened so that the fluid will move the ram through the pocket. This valve 88 is an interlocking device to prevent the downward movement of the ram 21 until the feed slide is properly positioned for the operation of the ram. In other words, the feed slide must be shifted so as to center the pocket beneath the ram or no fluid can pass to the motor for moving the ram downward.

The motor 43 for moving the feed slide is furnished operating fluid through a four-way valve 95. Fluid from the line $a$ passes through the branch line $b$ to the four-way valve 95 and thence through the line $b'$ to one end of the cylinder or the line $b^2$ to the other end of the cylinder depending upon the setting of the four-way valve. When $b'$ is furnishing fluid the exhaust from the other end of the motor passes through the line $b^2$ and the four-way valve to the line $h'$ and thence to the line $h$ leading to the tank. The pilot valve 54 controls the position of the four-way valve. The fluid from the line $a$ is used to shift the valve under control of the pilot valve. Fluid from the line $a$ passes through the pilot valve when properly set and through the line $a'$ to one end of the four-way valve. The other end of the four-way valve is connected through the line $g$ to the pilot valve 54 and through the pilot valve to the line $h^2$ which is an extension of the return line $h$. The pilot valve is only moved on the upward movement of the ram by the pawl 59. The downward movement of the ram is idle and therefore the only time that the pilot valve 54 can be opened to shift the four-way valve 95 is when the ram is well above the feed slide. At this time the slide is free to be moved.

There is therefore provided an interlocking mechanism between the fluid operated devices so that the feed slide can only be shifted when the ram is above the feed slide and out of the pockets therein and likewise the ram cannot be moved downward until the feed slide is positioned so that one of its pockets is in alinement with the rod. This is very essential to the proper timing of the operation of the extrusion press.

While there is shown and described an extrusion press having many extrusion tubes and associated rams it will be understood that a single unit machine embodying the improvements described above could be used with little or no modifications of the presently described mechanisms.

It is obvious that many changes may be made in the extrusion tube, the associated ram and the feeding mechanism without departing from the spirit of the invention as set forth in the appended claims.

I claim:

1. An extrusion press for forming cork rods from a composition of cork granules and a binder, comprising a vertical extrusion tube, a ram movable into and out of said tube for forcing the cork composition downwardly therethrough, means for placing a measured amount of cork composition in the extrusion tube while the ram is withdrawn therefrom, said extrusion tube including an upper section where the composition is formed into rod shape, an intermediate heating section for liquifying the binder, a lower cooling section of relatively low frictional resistance to the advancing cork mass and a discharge section of the same cross-section but having a relatively greater frictional resistance to the cork mass.

2. A multiple tube extension press for forming rods of cork composition comprising a series of vertical parallel forming and extrusion tubes, means for delivering successive measured portions of plastic cork composition into the upper ends of said tubes, a ram for forcing each portion of composition down through the respective tube, each tube comprising an upper forming section, an intermediate heating section, a lower cooling section of relatively low frictional resistance to the advancing cork mass and a discharge section of the same cross-section but having a relatively greater frictional resistance to the cork mass.

References Cited in the file of this patent

UNITED STATES PATENTS

| | | |
|---|---|---|
| 1,298,749 | McManus | Apr. 1, 1919 |
| 1,508,782 | Ellrich | Sept. 16, 1924 |
| 1,511,555 | Yngve | Oct. 14, 1924 |
| 2,332,211 | Field | Oct. 19, 1943 |
| 2,335,307 | Pendergrast | Nov. 30, 1943 |
| 2,335,308 | Pendergrast | Nov. 30, 1943 |
| 2,403,476 | Berry et al. | July 9, 1946 |
| 2,552,458 | Reiskind et al. | May 8, 1951 |
| 2,672,650 | Westerberg | Mar. 23, 1954 |